United States Patent [19]

Kullman

[11] Patent Number: 5,477,763

[45] Date of Patent: Dec. 26, 1995

[54] SAW BLADE

[75] Inventor: Jörg H. Kullman, Spangenberg, Germany

[73] Assignee: Wikus-Sagenfabrik, Wilhelm H. Kullmann, Spangenberg, Germany

[21] Appl. No.: 173,562

[22] Filed: Dec. 27, 1993

Related U.S. Application Data

[63] Continuation-in-part of Ser. No. 3,517, Jan. 12, 1993, abandoned.

[30] Foreign Application Priority Data

Jan. 13, 1993 [DE] Germany .................. 43 00 622.1

[51] Int. Cl.⁶ .................................................. B27B 33/02
[52] U.S. Cl. .................................. 83/846; 83/850; 83/851
[58] Field of Search ........................... 83/846, 847, 848, 83/849, 850, 851, 676

[56] References Cited

U.S. PATENT DOCUMENTS

| | | | |
|---|---|---|---|
| 4,011,783 | 3/1977 | Mobley | 83/851 X |
| 4,604,933 | 8/1986 | Lesher et al. | 83/851 |
| 4,640,172 | 2/1987 | Kullmann et al. | 83/847 X |
| 4,813,324 | 3/1989 | Yoshida et al. | 83/848 |
| 4,958,546 | 9/1990 | Yoshida et al. | 83/848 |
| 5,425,296 | 6/1995 | Kullmann et al. | 83/846 |

FOREIGN PATENT DOCUMENTS

| | | |
|---|---|---|
| 2086975 | 11/1993 | Canada . |
| 640987 | 12/1936 | Germany . |
| 2516137 | 10/1976 | Germany . |
| 3611063 | 10/1986 | Germany . |
| 3741709 | 6/1989 | Germany . |
| 9206000 | 9/1992 | Germany . |
| 157917 | 12/1981 | Japan ................... 83/846 |

Primary Examiner—Rinaldi I. Rada
Assistant Examiner—Raymond D. Woods
Attorney, Agent, or Firm—Hopkins & Thomas

[57] ABSTRACT

A saw blade including a basic body (1) with a plurality of unset teeth along the edge of the basic body, each tooth having a cutting edge. The teeth are provided in recurring cycles on the saw blade. Each recurring cycle has at least one group of teeth (2) comprised of at least two teeth therein, the teeth being formed symmetrically with respect to a longitudinal center plane (8) along which the basic body lies. At least two groups of teeth ($2_n$, $2^*$) are provided in the recurring cycle, where the teeth of the second group are interspersed among the teeth of the first group within the recurring cycle of teeth. The teeth in the first group of teeth progressively decrease in height and increase in width from tooth to tooth. whereas the teeth of the second group of teeth are each formed identically, each tooth of the second group of teeth being wider than any one tooth of the first group of teeth.

20 Claims, 4 Drawing Sheets

SAW BLADE

CROSS REFERENCE TO RELATED APPLICATIONS

This application is a continuation-in-part of application Ser. No. 08/003,517 filed on Jan. 12, 1993, now abandoned and replaced by file wrapper continuation application Ser. No. 08/265,515 filed on Jun. 24, 1994, now U.S. Pat. No. 5,425,296.

FIELD OF THE INVENTION

The invention relates to a saw blade with a basic body and unset teeth with cutting edges which are provided in recurring cycles, each of cycle having at least one group of teeth with at least two teeth in each group, where these teeth are arranged symmetrically with respect to the basic body. The invention can be applied to a band saw blade, a hacksaw blade, or a circular saw blade.

BACKGROUND OF THE INVENTION

The German Offenlegungsscnrift 36 11 063 discloses a saw blade with teeth in a recurring cycle. Each cycle also comprises a group of teeth, so that the number of teeth in a group is equal to the number of teeth in a cycle. The teeth in one group with respect to the cycle of teeth are differentiated as being either a leading tooth, this being one or more of the first teeth of a group or cycle, or as being following teeth. The leading tooth or teeth are often formed as unset teeth, whereas the following teeth in most cases are formed to be set teeth. Usually all teeth are of the same width. The leading tooth has the greatest height, and the height decreases in a group. Sometimes the leading tooth is phased or its cutting edge is broken by a chip breaking flute. The following teeth are usually formed as teeth set alternately to the left and right to create a cutting channel wider than the basic body of the saw blade. When two leading teeth are provided, these can be stepped like the well known roughing and finishing teeth of a circular saw blade, by which the effective edge is distributed between the two leading teeth. The cycle is completed by the set following teeth, which create a wider cutting channel. The decrease of height usually occurs in a step-like fashion, but there are embodiments with teeth which are different with regard to their height and are arranged in the cycle in a non regular way. In one of the depicted embodiments seven teeth are provided, with an unset leading tooth, which has a straight cutting edge the width of the basic body. Following this leading tooth are three pairs of following teeth, all of which are set alternately to the left and right.

The last two pairs of following teeth may have identical set width in conjunction with equal or unequal height of the teeth, so that these last four following teeth define the width of the cutting channel and work alternately on the two facing surface planes of the cutting channel. For instance, the fifth and seventh teeth in a group comprised of seven teeth will work on the same surface of the cutting channel. The seventh tooth performes a following work step in relation to the fifth tooth, which serves to compensate the deviation from the path caused by the fifth tooth.

In a further embodiment five teeth are provided in a group and therefore in a cycle. The first tooth is unset, whereas the four following teeth are set teeth. The setting of the first and fourth following teeth is greater than that of the second and third following teeth, though. Therefore each surface of the cutting channel is worked on by a single tooth of the group only. This is also the case when two set leading teeth are used in place of one unset leading tooth.

The German Offenlegungsschrift 36 11 063 also describes an illustrative embodiment which employs no set teeth but only unset teeth in a group of teeth with respect to a cycle of teeth. In one group two following teeth are assigned to one leading tooth. The height of the teeth in a group decreases and the width increases. The last, widest tooth is provided once only. All the teeth are formed symmetrically with respect to a longitudinal center plane through the basic body. The present invention uses such a saw blade as a starting point. The first tooth in a group of teeth has a straight and continuous cutting edge perpendicular to the longitudinal center plane of the saw blade. The width of this first tooth is equal to the width of the basic body. Both of the two following teeth also have cutting edges perpendicular to the longitudinal center plane of the basic body, of which, due to the increasing width, only the outer parts contribute to the cutting process. The following teeth have differing flank angles and the angle enclosed between flank and cutting edge is also different for each of the following teeth, but in each case it is an acute angle. The effective cutting edge decreases in length from tooth to tooth, so that the main contribution to the cutting process is provided by the leading tooth and the two following teeth only widen the cutting channel, so that a clearance cut is achieved. This embodiment of a saw blade is intended to coincide in function and effect with the embodiments in which set teeth are used. While set teeth can be manufactured without too much difficulty, a saw blade with unset teeth of different width is extremely elaborate in production, it not being clear how the greater width of the following teeth as compared to the width of the basic body is to be achieved in the first place. In addition, this embodiment with unset teeth displays numerous other disadvantages. The effective part of the cutting edge of the following teeth and their flank enclose an acute angle, i.e. an angle of less than 90°, so that these lateral tips of the teeth are subjected to substantial wear during the cutting process, by which the width of the cutting channel rapidly decreases. With set teeth this disadvantage does not occur to such a great extent, because the angle between effective cutting edge and flank is always about 90°. Set following teeth are always unfavorable for the straight running of a saw blade, though, because lateral forces are created by them. These forces, acting on one side only, cause a deflection of the set tooth concerned. This not only results in a poorer surface quality of the cut face in the cutting channel, but also causes vibrations of the saw blade. The unset leading tooth has no lateral clearance so that its flanks cause friction in the cutting channel. The leading tooth must perform the main cutting work and clear the greatest cross section. The same holds for more than one leading tooth in a group of teeth; in all cases the set teeth are loaded less. All embodiments of the known saw blade attempt to achieve that both leading and following teeth contribute to the cutting process. The chips are reduced to a small size, which makes their removal easier and enables a higher cutting speed. By including buffer teeth, the load on the leading teeth is reduced and distributed more evenly among all teeth. From the German Offenlegungsschrift 25 16 137 a circular saw blade is known, in which a cycle comprises a group of teeth having a pre cutter and a final cutter. The pre-cutter and final cutter teeth have the same tooth-height and their width is the same as that of the basic body. The pre-cutter and final cutter teeth have differently angled phases, so that different chips are removed by the respective cutters in the known way. The achievable surface quality is comparably poor, due to the fact that there is friction between the basic body and the adjacent material in the cutting channel.

SUMMARY OF THE INVENTION

The invention is based on the object of providing a saw blade of the type described above, which provides a stabilized straight movement in combination with a superior surface quality in the cutting channel. The roughness of the surface created in the cutting channel is smaller than previously achieveable.

According to the invention this is achieved by a saw blade of the type described above, wherein at least two groups of teeth are, preferably regularly, intermixed in a cycle, with the first group consisting of at least two teeth with a decreasing height and increasing width graduation, while the teeth of the second group are formed identically and have the greatest width.

The invention is based on the idea to have two different groups of teeth in a cycle, but that these groups should contrary to being arranged one after the other, as is customary, be intermixed instead. This "overlapping" of the groups makes sense especially when it is regular. With such a regular intermixing, there can be, for example, first group consisting of three teeth, teeth 1, 2 3, which have a from tooth to tooth decreasing height and increasing width. This first group of three teeth primarily serves to deepen the cutting channel. The second group of teeth may consist of three teeth 4, where each tooth 4 has a smaller height but a greater width than tooth 3 of group one. This second group of teeth serves to finish the surface of the cutting channel. The two groups are regularly intermixed when the resulting order of teeth in the cycle becomes 1, 4, 2, 4, 3, 4, where, for simplicity's sake, a constant pitch is assumed, so that a complete cycle consists of six teeth. This intermixing or mutual overlapping of the groups in a cycle, in combination with the advance of the saw blade, has the extraordinary advantage that the teeth of the first group remove relatively thick chips and the teeth of the second group remove relatively thin chips from the cutting channel. When removing thick chips, wear of the effective cutting edge is not as disadvantageous as when removing extremely thin chips. This more numerous ocurrance of the teeth of the second group, which are wider, is responsible for the better quality surface finish in the cutting channel. Due to this, the invention clearly stands apart from the case where the widest tooth within a group of teeth of different width occurs only twice in a double arrangement. In terms of the above given example this would be an order of 1, 2, 3, 3 in the cycle. Nevertheless, in accordance with the invention, a double arrangement of teeth in the intermixing is possible, yielding a first group of teeth with two second groups of teeth in a cycle, so that for the example given the order would be 1, 4, 4, 2, 4, 4, 3, 4, 4. Irregular intermixing of five teeth 1, 2, 3, 4, 5 of a first group with two teeth 6 of the second group resulting in an order 1, 2, 3, 6, 4, 5, 6, also is in accordance with the invention. The number of teeth in the first group should be no less than two. The number of teeth in the second group should also be no less than two. Usually the number of teeth will be the same in both groups. It is possible to have an equal load on all teeth of group one and likewise on group two, but with the two loads on each group being different. The invention may not be confused with the known technology of pre- and final cutters used on circular saw blades. Circular saw blades only have two different kinds of teeth, the aforementioned pre- and final cutters. This can be described as one group consisting of one pre-cutter and one final cutter. The second group of the cycle is missing. When intermixing the groups in accordance with this invention, unset teeth are employed. Nevertheless, interspersing set teeth will not fault the invention, but also does not lead to an improvement of the qualities.

The individual teeth in the first group are not based on the concept of leading and following teeth, instead the teeth can be considered to do the equal work, since all teeth of the first group carry the same load. The distribution of the contributing cutting edge sections on to the edges of the teeth of the first group and their relatively wide spacing, e.g. the distance of two pitches serves the goal to remove chips of relatively large thicknesses.

The invention can also be applied in combination with the known pre-cutter and final cutter technology. A simple example is the order: pre-cutter, widest tooth of the second group, final cutter, widest tooth of the second group.

It is especially advantageous when the saw blade has unset teeth only and when the effective cutting edges with respect to the cutting edge sections are formed by an inflected cutting edge—as opposed to a continuous straight-line cutting edge—, so that each thick chip removed with the effective cutting edge of a tooth, especially of the first group of teeth, is subjected to two forces acting in different directions, which act to break up the chip. This chip-breaking effect is also found with the second group of teeth, though less pronounced, since this second group removes thinner chips anyway. The realization of phases on all teeth of both groups in a symmetric orientation with respect to the longitudinal center plane serves in a special way to stabilize the forward movement of the saw blade. A stabilizing wedge action by an even "support" of the teeth of both groups is achieved in the cutting channel, so that there are no resulting lateral forces on any tooth. By having symmetrical phases on each tooth, the two lateral forces on the tooth cancel each other out. The saw blade therefore has no tendency to run out of a straight line. The widest tooth in the cycle, which comprises the second group through repeated use, has as angle between phase and flank greater than 90°. Preferably this angle should be greater than 100° to further reduce the possibility of wear. In effect it is this outer edge that works upon the side walls of the cutting channel and is responsible for the improved surface quality. Since the angle between phase and flank is substantially greater than 90° at this point, the inevitable wear on the teeth of the second group is less detrimental than an acute angle between phase and flank. A more numerous employment of the teeth of the second group also contributes positively to this cause. The results are a longer service life of the saw blade as well as surprising surface quality in the cutting channel. In addition, the obtuse angled geometry brings about a great stability against material breaking out of the cutting edge corners, which is of particular importance when using hard metal cutters.

It should be pointed out that the invention can at first be realized when applying a constant pitch in a cycle. In this way already, the height graduation and the width graduation of the teeth in a group produce reduced sensitivity to vibrations and outstanding straight run performance, in spite of the similarity in the shaping of the teeth. However, what is of particular significance, and what the invention readily allows, is to use the described design in combination with a variable pitch. Through the use of a variable pitch the teeth of the first and second group with their intermixing form something like a third group, which recurrs several times in each cycle. In the above described example with three teeth 1, 2, 3 of the first group and three teeth 4 of the second group and the use of 5 different pitches the resulting cycle is comprised of 30 teeth. The intermixing of the teeth 1, 4, 2, 4, 3, 4 is repeated five times according to five different pitches.

In a preferred embodiment one tooth of the second group is included between two teeth of the first group. It is also possible to include two teeth of the second group between two teeth of the first group. By this measure, the "effective pitch" between the teeth of the first group is increased, which in turn produces thicker chips at a constant advancement, while on the other hand the teeth of the second group will produce even finer chips in the cutting channel.

The phases on all teeth in both groups can be arranged at a common phase angle with respect to a straight line perpendicular to the longitudinal center plane of the basic body. Consequently, these phases run parallel to each other, on the left hand side and right hand side of the teeth, respectively, on account of the symmetrical design with respect to the longitudinal center plane through the basic body. With a uniform height graduation, a uniform distance from phase to phase is obtained in the projection, if the point at which the cutting edge is inflected is chosen correspondingly. If the effective areas cleared by the teeth are regarded, the design of the teeth in the first group can be arranged so that identical distributions are distributed over all the teeth in the first group. It is also possible, however, to provide different distances between the phases, even while maintaining the same phase angles in the projection. On the other hand, the phases angles need not necessarily coincide. The number of points of inflection in an effective, jutting—out or protruding cutting edge section may also be greater then one. The second group of teeth is of equal design. Each tooth of the second group is of the same height, same width and same form of the cutting edge. Since the teeth of the second group exclusively function to work on the cut surface, they can be rounded between phase and flank, to further reduce wear and to obtain a smooth cut surface of the cutting channel.

At least the teeth of the second group should be wider than the basic body, which does not exclude that the teeth of the first group also be wider than the basic body. Then a free cut is obtained.

The flanks of all teeth of the second group may be provided at a flank angle in the range between 3° and 12°, in particular 8°. A small flank angle in conjunction with a large phase angle produces a very stable design of the free corners of the teeth in the second group. For the corners of the teeth in the first group this is of minor importance, since these corners, due to their relatively small width, do not contribute to the cutting work. It is also possible, however, that the flanks of all the teeth in both groups are provided at a coinciding flank angle with a congruent projection. This simplifies production considerably, in that the flanks of all the teeth can be worked upon with a constant machine setting, e.g. by grinding.

The teeth of both groups may be provided as hard metal tipped, ground teeth. In conjunction with the phase angle, a width graduation then also occurs. The teeth are consequently formed with a large overall surface area and can thus be loaded fully. Generally, the teeth or major parts thereof are produced by hard metal tipping and by grinding. Beforehand, the band strip of the basic body is correspondingly prepared by some milling, punching or grinding process. It is also possible, however, to use a rolled, conically widened bimetal strip as the basic material, and to form the teeth of both group by a combined milling/punching/grinding operation.

Groups which have recurring, variable pitches may be formed in the recurring cycle of teeth. The number of teeth in the pitch group does then not necessarily have to coincide with the number of teeth in both groups. In a pitch group with five different pitches and a first and second group of teeth with three teeth each, the total number of teeth in the cycle is thirty. The number of teeth in a cycle is the smallest common multiple of the number of teeth in the pitch group and the number of teeth in the two intermixed groups. By having such a high number of teeth in a cycle, the saw blade becomes less prone to vibrations. It has surprisingly greater running smoothness with stabilized straight running and a greatly extended service life compared to standard saw blades. The number of teeth in a further group of teeth, which is given by the order of variable pitches, cannot be the same as the number of teeth in the first two groups, thus the number of teeth in a cycle becomes large, and the saw blade runs very stable. It is also possible, however, that the number of teeth in this further group, corresponding to the number of pitches, coincides with the number of teeth in a cycle.

BRIEF DESCRIPTION OF THE DRAWINGS

The invention is further explained and described with reference to a number of illustrative embodiments. The drawings show in.

DETAILED DESCRIPTION

Figure 1:
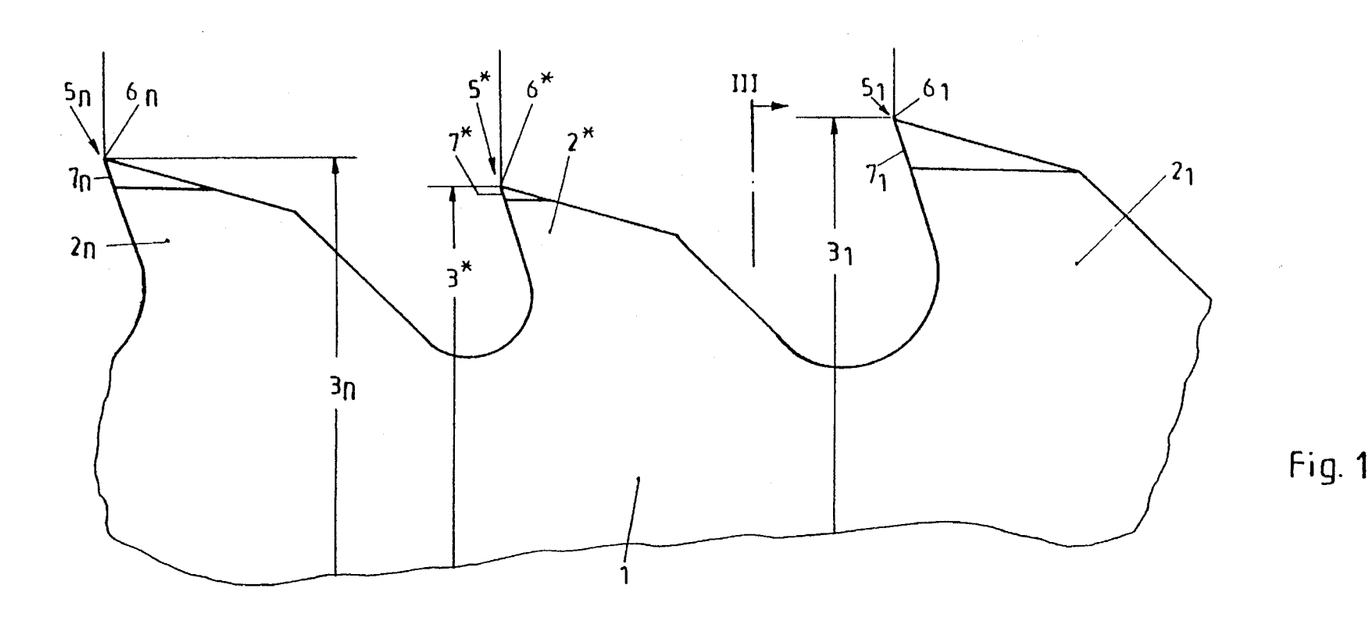
FIG. 1 an enlarged partial side cut away view of a saw blade.
Figure 2:
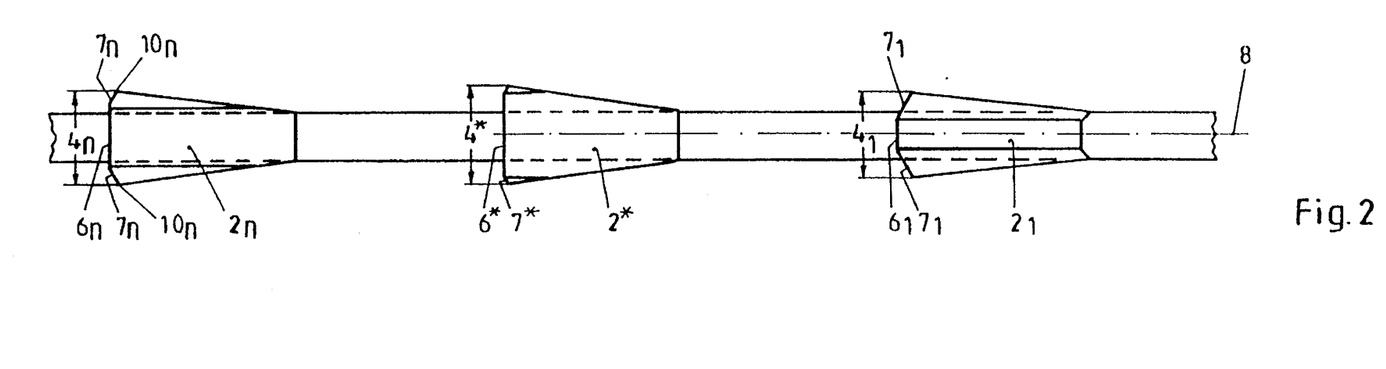
FIG. 2 a plan view of the saw blade of FIG. 1.

The cut away portion of the band saw blade illustrated in FIG. 1 in a cutout has a basic body 1 with unset teeth 2, 2', which are provided in recurring cycles. A first group of teeth 2 is comprised of teeth differing in height and width. The first tooth $2_n$, of such a group is designated by the index 1, while the last tooth $2_n$ of a group of teeth is designated by the index n. A second group of teeth 2\* which do not differ in height or width is also provided. The tooth 2\* is lower than the lowest tooth $2_n$ of the first group. The tooth 2\* is wider than the widest tooth $2_n$ of the first group. In a simple case, the number of teeth in a cycle will be the sum of teeth in the first and second group, as is the case with constant pitch. Here, the number of teeth in the first group is two, better three or more. The number of teeth in the second group is at least two, preferably equal to the number of teeth in the first group, though. Each tooth 2, 2\* possesses a height 3, 3\*, with the same indexing as above. The teeth 2 in the first group have a height graduation in a way that the height 3 decreases from tooth to tooth. The height $3_1$ of the first tooth $2_1$ of the first group is greater than the height of the second tooth $2_2$ of the first group, the height of the tooth $2_2$ is greater than the height of the third tooth $2_3$, etc. The heigth $3_n$ of the last tooth $2_n$ of the first group is still higher than the heigth $3^*$ of the teeth of the second group. The teeth 2 of the first group also are of different width 4, with a width graduation so that the first tooth $2_1$ has the smallest and the last tooth $2_n$ the largest width. The tooth $2^*$ in the second group is still wider than the widest tooth $2_n$ of the first group, though. Each tooth 2, $2^*$ has an inflected cutting edge 5, $5^*$, which is formed by an inner section 6, $6^*$ and an outwardly adjoining phase 7, $7^*$. The sections 6, $6^*$ run transverse and perpendicular to a longitudinal center plane 8 through the basic body 1. The design of each tooth is symmetrical to the longitudinal center plane 8, so the phases 7, $7^*$ on the left and right of the tooth 2, $2^*$ are symmetric. As especially FIG. 3–6 show, the phases 7, $7^*$ are inclined towards the basic body 1. This produces a phase angle 9 for all teeth 2, $2^*$ which should be provided in the range between 20° and 60°—preferably about 45°. The phase angle 9 for all teeth 2, $2^*$ is the angle between the phase 7, $7^*$ and a direction that is perpendicular to the longitudinal center plane 8. The phases 7, $7^*$ on the individual teeth 2, $2^*$ of both groups are formed in such a way that the first and highest tooth $2_1$ has a comparatively narrow section $6_1$ which is smaller than the width of the basic body 1, while the tooth $2^*$ has a straight section $6^*$ wider than the basic body 1.

Figure 3:
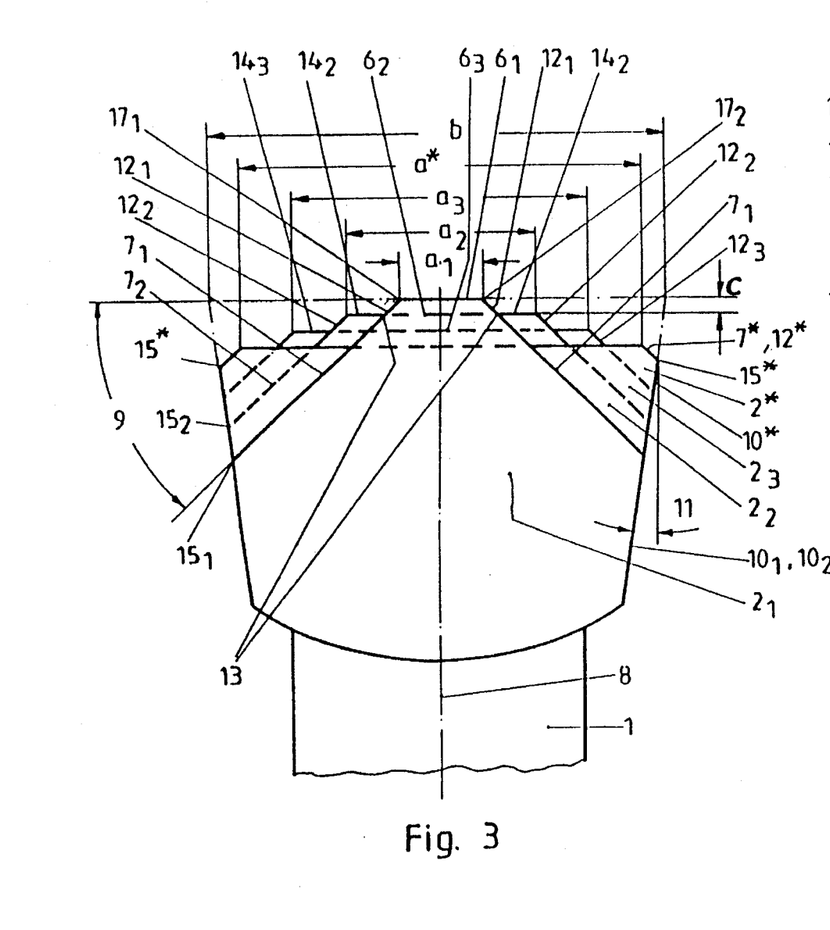
FIG. 3 a view in the direction of the line III—III in FIG. 1 on a band saw blade with three teeth each in the first and second group, FIG. 4 a similar view as FIG. 3, but of a second embodiment of a saw blade, FIG. 5 a similar view as FIG. 3, but of a third embodiment, FIG. 6 a similar view as FIG. 3, but of a fourth embodiment of a saw blade, FIG. 7 a partial view of a band saw blade of FIGS. 1, 3, or 4 with a constant pitch, FIG. 8 a side view of a saw blade with a variable pitch, and FIG. 9 a side view of a saw blade with a constant pitch as in FIG. 7, but with a double arrangement of the teeth in the second group.

The different shaping can be seen most readily in FIG. 3, in which an embodiment with three teeth 2 in the first group and three teeth $2^*$ in the second group is depicted. The cycle with six teeth is obtained by intermixing the two groups of teeth in the following way: $2_1$, $2^*$, $2_2$, $2^*$, $2_3$, $2^*$. In plan view the highest tooth $2_1$, with its relatively small section $6_1$ of length $a_1$, is seen first. This section $6_1$ is adjoined by the relatively long phase $7_1$ on the first tooth $2_1$, which in this case has a phase angle 9 of 45°. The phase $7_1$ extends to the flank $10_1$ of the tooth $2_1$. The flank 10 widens from the basic body 1 in the direction of the tip of the teeth 2, $2^*$. The flank has a flank angle 11 with respect to the basic body 1, which in this case is 8°. The flank angle 11 is not indexed, since it is the same for all teeth 2, $2^*$. The forming of the flanks 10 is performed by a grinding operation over all teeth 2, $2^*$ simultaneously. The first tooth $2_1$ cuts only with part of its cutting edge $5_1$, that is the part which extends or projects beyond the outline of the second tooth $2_2$ in the projection. The effective cutting section of tooth $2_1$ is comprised of the straight section $6_1$ and the adjoining section $12_1$ on both sides. The sections $12_1$ end at the projection intersection 13.

Following the highest tooth $2_1$ of the first group is the first tooth $2^*$ of the second group. This tooth $2^*$ has a smaller height $3^*$ than the teeth $2_1$, $2_2$ and $2_3$ of the first group, but a larger width $4^*$ than these.

The third tooth of the cycle is the second highest tooth $2_2$ of the first group. It has a straight section $6_2$ of length $a_2$, which again is adjoined by phases $7_2$ on both sides in a symmetric fashion. All phases 7 of all teeth 2 of the first group and $2^*$ of the second group are parallel to each other. Of the tooth $2_2$ as well, only a certain part cuts, that is the part of the cutting edge $5_2$ which extends beyond the other teeth. This cutting part is comprised of the two cutting edge sections $14_2$ of the section $6_2$ and the two adjoining sections $12_2$ of the phases $7_2$. The same holds for the third tooth $2_3$ of the first group and the intermixed teeth $2^*$ of the second group. For the teeth $2^*$ the sections $12^*$ are the same as the phases $7^*$. Exending the flanks 10 in the direction of a line through section $6_1$ yields a theoretical width b for the teeth 2, $2^*$.

It can be seen from FIG. 3 that only the outer corners $15^*$ of the teeth $2^*$ of the second group cut, while the corners $15_1, \ldots 15_n$ of the teeth 2 move within the cutting channel and do not contribute to the removal of material. For the service life and the inevitable wear at the corners $15^*$ it is important to note that the angle between the phase $7^*$ and the flank $10^*$ is not acute but obtuse, i.e. greater than 90°, preferably much so.

Figure 6:
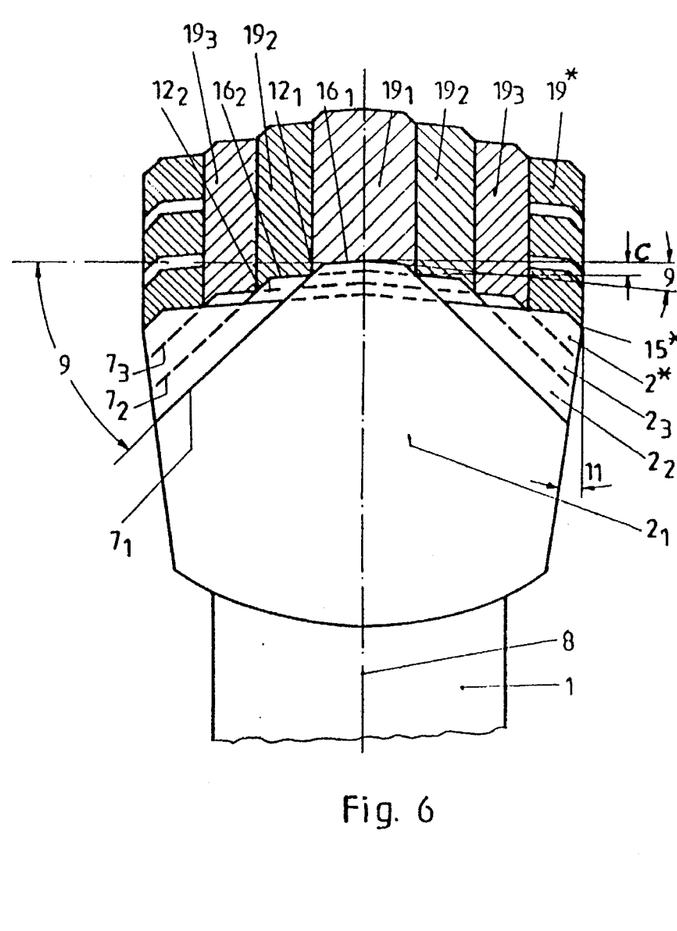

Also shown in FIG. 3 is the uniform height graduation, which even extends over the teeth 2 of the first group and the teeth $2^*$ of the second group. The height and width graduation in conjunction with the phase angle 9 has been chosen so that each tooth 2, $2^*$ of the two groups removes strips of material as shown in FIG. 6, where the width of the strip per tooth is roughly equal, the thickness of material removed being very different, though. The thickness of the strips is equal for the teeth $2_1$, $2_2$, $2_3$ of the first group; each remove a relatively thick chip from the material. The thicknesses of the strips $2^*$ are much smaller. It can be seen that while three thick strips are being removed per unit time by the teeth 2 of the first group, three thinner strips are being removed by the teeth $2^*$. Each chip removed by a tooth 2, $2^*$ is bent in two different directions at the inflection point 17 of the cutting edge between the straight section 6 and the effective part of the phase 7. This contributes to splitting up the individual chips further during removal.

Figure 4:
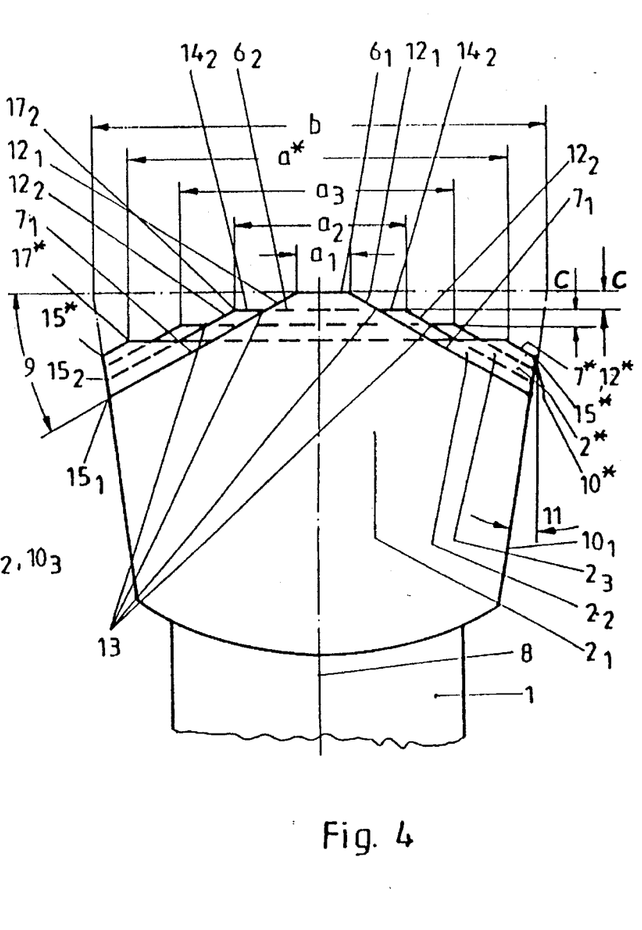

The embodiment of the FIG. 4 is similarly formed as the one in FIG. 3. However, the phase angle 9 is 30° in this case, while there are still three teeth 2 in the first group, intermixed with three teeth $2^*$ of the second group. Furthermore, it is assumed that there is also a constant pitch so there are still six teeth in a cycle. The height and width graduations are carried out uniformly over the teeth of both groups.

Figure 5:
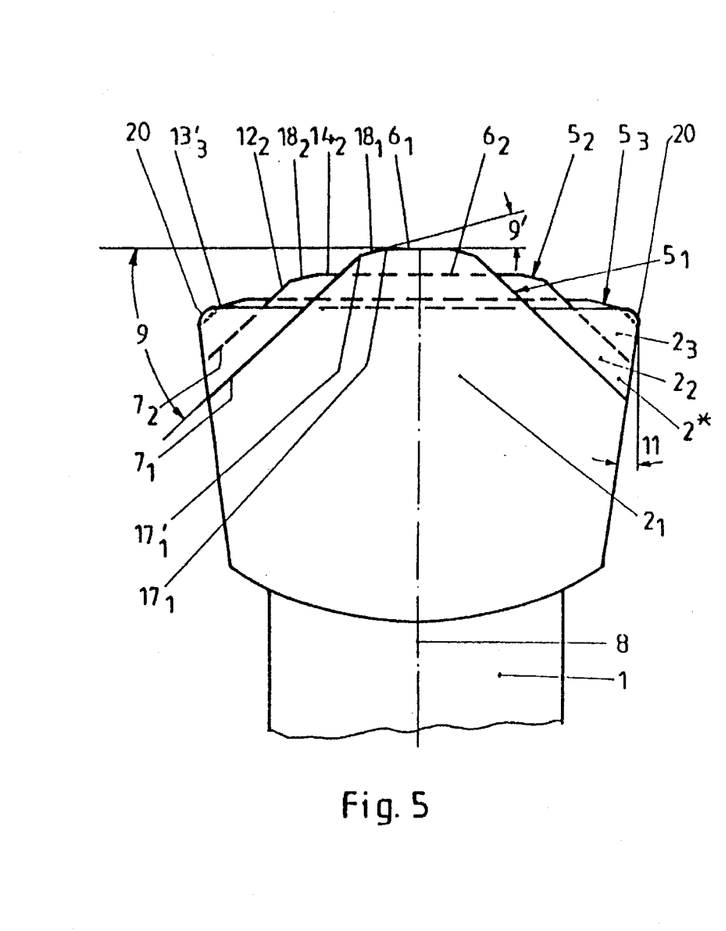

In the embodiment of FIG. 5 there are three teeth $2_1$, $2_2$, $2_3$ in the first group, intermixed with three teeth $2^*$ of the second group, so there are also six teeth in the cycle. The phase angle is 45° and the flank angle 11 has been chosen to be 8°. The cutting edges 5 of the teeth 2 of the first group are in this case comprised of three straight sections instead of two, so that there are two inflection points $17_1$ and $17_1''$. The first and therefore highest tooth $2_1$ has a straight section $6_1$, adjoined by a first phase section $18_1$ with a phase angle 9' and then the phase $7_1$. The phase $7_1$ has a phase angle 9. The second tooth, the first tooth $2^*$ of the second group, has a continuous, unbroken straight cutting edge and a rounded off corner 20, which works on the surface of the cutting channel. The following tooth $2_2$ of the first group has a straight cutting edge section $14_2$, a first phase section $18_2$, and a second phase 72. It can be seen that the entire phase section $18_2$ lies in the region of the effective part of the cutting edge of the tooth $2_2$, while of the phase $7_2$ again only the section $12_2$ is effective in a cutting manner. Tooth $2_2$ of the first group is again followed by a tooth $2^*$ of the second group, which in turn is followed by the third tooth $2_3$ of the first group. It is seen that the cutting edge 5 of each tooth can be changed in its shape by the number of inflection points 17, so that in the limit of infinitely many inflection points a rounded cutting edge is created for each tooth 2. But even in this embodiment, with an even height and width graduation only for the teeth 2 of the first group, thick chips are removed by the teeth 2, while the teeth $2^*$ still remove thin chips.

FIG. 6 depicts yet another embodiment, which may essentially coincide with the previously described embodiments. The number of teeth 2 in the first group is again three. The number of teeth $2^*$ in the second group is also three, so that there will be six teeth in a cycle with an even pitch. This time there are no straight, i.e. perpendicular to the longitudinal center plane 8, sections 6 provided for the teeth 2 of the first group and 2* of the second group, but instead slightly arrow shaped sections 16 with an angle 9". The hatched areas in FIG. 6 depict the stripes $19_1$, $19_2$, $19_3$, and 19* of material removed by the teeth $2_1$, $2_2$, $2_3$, and 2*, respectively.

Figure 7:
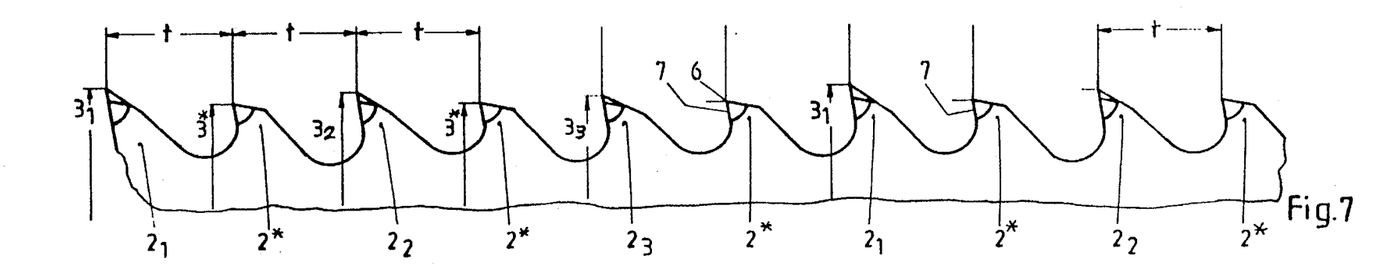

FIG. 7 shows a side view of FIGS. 1 and 3 over a full cycle, with three teeth $2_1$, $2_2$, and $2_3$ in the first group and three teeth 2* in the second group, so that a constant pitch yields a cycle of teeth $2_1$, 2*, $2_2$, 2*, $2_3$, 2*.

Figure 8:
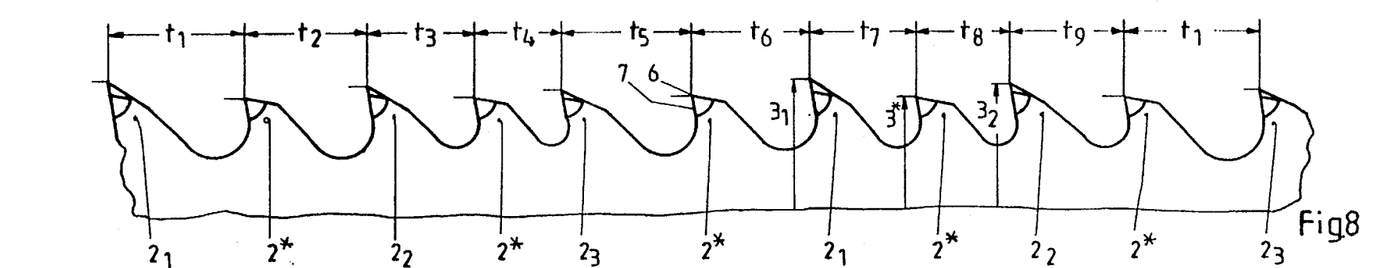

FIG. 8 illustrates the superposition of height and width graduation of teeth 2, 2* as in FIG. 7 with a variable pitch. For simplified illustration let it be assumed again that with regard to a height graduation there is a first group of three teeth 2 and a second group of three teeth 2*' which recurr in the specified sequences and are provided thus. The total number of teeth in the two groups is thus six. At the same time, a variable pitch with nine pitches $t_1, \ldots t_9$ is represented, so that in a group of teeth determined by the pitch, the number of teeth in such a pitch group is nine. The form of the teeth 2,2* with regard to the provision of cutting edges 5, sections 6, and phases 7 is precisely the same as described with reference to the preceding embodiments. The result is a cycle with the smallest common multiple number of teeth, i.e. 6×9=54. Not until the fifty—fifth tooth is there an exact correspondence with regard to its design, its height, and its assigned pitch.

Figure 9:
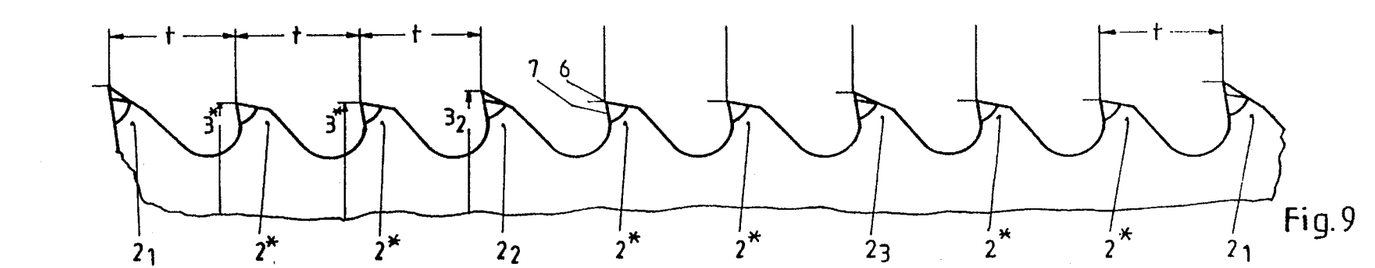

FIG. 9 shows another embodiment in side view, for simplicity*s sake with a constant pitch. A group of three first teeth $2_1$, $2_2$, $2_3$ is provided. To this a second group of three teeth 2* is assigned. This second group is formed and provided in a double recurrance. It could also be said that each tooth 2* appears twice. This causes the distance between the first tooth $2_1$ and the second tooth $2_2$ of the first group to become even larger, so that the chips removed by these teeth become even thicker. The teeth 2* remove relatively thin chips, with differently thick chips removed by the two second groups.

While the foregoing specification and drawings disclose preferred embodiments of the invention, it will be understood by those skilled in the art that variations and modifications thereof can be made without departing from the spirit and scope of the invention as set forth in the following claims.

LIST OF REFERENCE NUMERALS:
1—basic body
2—teeth
3—height
4—width
5—cutting edge
6—section
7—phase
8—longitudinal center plane
9—phase angle
10—flank
11—flank angle
12—section
13—projection intersection
14—cutting edge section
15—corner
16—section
17—inflection point
18—phase section
19—stripe
20—rounded corner

I claim:

1. A saw blade, comprising:
   a flat basic body formed symmetrically about a longitudinal center plane, said body having an elongated edge portion:
   a plurality of spaced teeth formed along said edge portion of said body, said teeth being spaced from each other along the edge portion of said body in at least one recurring cycle of teeth:
   wherein said at least one recurring cycle of teeth includes a first group of teeth and a second group of teeth, said first and second groups of teeth each having at least two teeth therein, the teeth of said first group of teeth progressively decreasing in height and increasing in width from tooth to tooth therein, the teeth of said second group of teeth being substantially identical in size and shape with respect to each other therein; and
   wherein the teeth of said second group of teeth are alternatingly interspersed among the teeth of said first group of teeth within said at least one recurring cycle of teeth.

2. The saw blade of claim 1, wherein each of said teeth comprises a cutting edge, said cutting edge of each tooth being formed as an inflected cutting edge formed at an angle along said elongated edge portion and facing an anticipated direction of saw blade travel, said cutting edge of each tooth further comprising an effective cutting edge having a plurality of cutting edge sections.

3. The saw blade of claim 1, wherein said second group of teeth are wider than said basic body.

4. The saw blade of claim 1, wherein said second group of teeth are wider than any of the teeth from said first group of teeth.

5. The saw blade of claim 1, wherein each of said teeth extend symmetrically on opposite sides of the longitudinal center plane of said body.

6. The saw blade of claim 5, wherein each of said teeth comprises:
   a cutting edge which extends approximately at a right angle with respect to the longitudinal center plane of said body;
   adjoining phases extending to opposite sides of said cutting edge, said phases being inclined toward said basic body:
   flanks which extend from said adjoining phases toward the basic body to form the tooth;
   a phase angle formed with respect to the cutting edge and one of the phases of said tooth; and
   a flank angle formed with respect to one of the flanks of said tooth and a line parallel to the longitudinal center plane of said basic body.

7. The saw blade of claim 6, wherein another angle is formed with respect to one of the phases and the flank of the tooth facing outwardly of the tooth, wherein said other angle within the teeth of said second group of teeth is greater than ninety degrees.

8. The saw blade of claim 6, wherein said share angles of the teeth of said first and second groups of teeth are identical.

9. The saw blade of claim 6, wherein said flank angles of the teeth in said second group of teeth range from three degrees to twelve degrees.

10. The saw blade of claim 9, wherein said flank angles are eight degrees.

11. The saw blade of claim 6, wherein the teeth of said second group of teeth further comprise a rounded corner where said cutting edge and each of said phases adjoin one another.

12. The saw blade of claim 1, wherein each of said teeth comprises a ground metal tooth.

13. The saw blade of claim 1, wherein there is at least one tooth from said second group of teeth interspersed between each two adjacent teeth of said first group of teeth.

14. The saw blade of claim 1, wherein there is a constant tooth pitch between each tooth within said at least one recurring cycle of teeth.

15. The saw blade of claim 1, wherein there is a recurring variable tooth pitch between each tooth within said at least one recurring cycle of teeth forming a third group of teeth therein.

16. The saw blade of claim 15, wherein the number of teeth in said third group of teeth is not equal to the number of teeth in said first group of teeth and the number of teeth in said second group of teeth.

17. A saw blade, comprising:

a flat basic body formed symmetrically about a longitudinal center plane, said body defining an elongated edge portion thereon;

said elongated edge portion of said body including a plurality of teeth spaced from each other in at least one recurring cycle of teeth:

wherein said at least one recurring cycle of teeth includes a first group of teeth and a second group of teeth, said first and second groups of teeth each having at least two teeth therein, the teeth of said first group of teeth progressively decreasing in height and increasing in width from tooth to tooth therein, the teeth of said second group of teeth being substantially identically sized and shaped with respect to each other therein, the teeth of said second group of teeth also being wider than said basic body and wider and shorter than any one tooth from said first group of teeth; and wherein the teeth of said second group of teeth are alternatingly interspersed among the teeth of said first group of teeth within said at least one recurring cycle of teeth.

18. The saw blade of claim 17, wherein there is a constant tooth pitch between each tooth within said at least one recurring cycle of teeth.

19. The saw blade of claim 17, wherein there is a recurring variable tooth pitch between each tooth within said at least one recurring cycle of teeth forming a third group of teeth therein.

20. The saw blade of claim 14, wherein the number of teeth in said third group of teeth is not equal to the number of teeth in said first group of teeth and the number of teeth in said second group of teeth.

* * * * *